(12) United States Patent
Ngo et al.

(10) Patent No.: US 12,709,002 B2
(45) Date of Patent: Aug. 18, 2026

(54) DEVICE AND METHOD FOR TRAINING A MACHINE-LEARNING MODEL FOR DETERMINING A GRASP OF A MULTI-FINGER GRIPPER FOR MANIPULATING AN OBJECT

(71) Applicant: Robert Bosch GmbH, Stuttgart (DE)

(72) Inventors: Anh Vien Ngo, Nehren (DE); Gerhard Neumann, Karlsruhe (DE); Philipp Blaettner, Zuffenhausen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 32 days.

(21) Appl. No.: 18/753,453

(22) Filed: Jun. 25, 2024

(65) Prior Publication Data

US 2025/0033195 A1 Jan. 30, 2025

(30) Foreign Application Priority Data

Jul. 27, 2023 (EP) .................................... 23188221

(51) Int. Cl.
*B25J 9/16* (2006.01)
*G06T 7/73* (2017.01)

(52) U.S. Cl.
CPC ............. *B25J 9/161* (2013.01); *B25J 9/1697* (2013.01); *G06T 7/73* (2017.01); *G06T 2207/10028* (2013.01)

(58) Field of Classification Search
None
See application file for complete search history.

(56) References Cited

U.S. PATENT DOCUMENTS

| | | | | |
|---|---|---|---|---|
| 10,099,369 | B2 * | 10/2018 | Kopicki | B25J 9/163 |
| 2020/0061811 | A1 * | 2/2020 | Iqbal | G06N 3/0499 |
| 2022/0009091 | A1 * | 1/2022 | Moreno Noguer | B25J 9/1653 |
| 2022/0016766 | A1 | 1/2022 | Humayun et al. | |
| 2022/0270198 | A1 * | 8/2022 | Han | G06T 7/50 |
| 2022/0288783 | A1 * | 9/2022 | Sundermeyer | G06T 7/55 |
| 2022/0402125 | A1 * | 12/2022 | Moreno Noguer | B25J 9/161 |

(Continued)

OTHER PUBLICATIONS

Liu, Min & Pan, Zherong & Xu, Kai & Ganguly, Kanishka & Manocha, Dinesh. (2020). Deep Differentiable Grasp Planner for High-DOF Grippers. 10.48550/arXiv.2002.01530. (Year: 2020).*

(Continued)

*Primary Examiner* — Khoi H Tran
*Assistant Examiner* — Trang Dang
(74) *Attorney, Agent, or Firm* — NORTON ROSE FULBRIGHT US LLP

(57) ABSTRACT

A method for training a machine-learning model for determining a grasp of a multi-finger gripper for manipulating an object. The method includes, for each of a plurality of scenes, each scene including an object in a respective pose, determining a point cloud representation of the object included in scene, determining, by the machine-learning model, a multi-finger grasp for each of a plurality of surface points of the object, determining a grasp loss of the grasp, wherein the loss includes at least one of a collision loss and a grasp stability loss, determining a total loss including the determined grasp losses and adjusting the machine-learning model to reduce the total loss.

13 Claims, 3 Drawing Sheets

(56) References Cited

U.S. PATENT DOCUMENTS

2024/0083021 A1* 3/2024 Power .................... B25J 9/1612

OTHER PUBLICATIONS

Corona, Enric et al. "GanHand: Predicting Human Grasp Affordances in Multi-Object Scenes." 2020 IEEE/CVF Conference on Computer Vision and Pattern Recognition (CVPR) (2020): 5030-5040. (Year: 2020).*

Wang, Ruicheng et al. "DexGraspNet: A Large-Scale Robotic Dexterous Grasp Dataset for General Objects Based on Simulation." 2023 IEEE International Conference on Robotics and Automation (ICRA) (2022): 11359-11366. (Year: 2023).*

Liu, Min et al. "Deep Differentiable Grasp Planner for High-DOF Grippers." ArXiv abs/2002.01530 (2020): n. pag. (Year: 2020).*

Ferrari et al., "Planning Optimal Grasps," Proceedings 1992 IEEE International Conference on Robotics and Automation, ICRA, vol. 3, No. 4, 1992, pp. 2290-2295.

Wang et al., "Dexgraspnet: a Large-Scale Robotic Dexterous Grasp Dataset for Generalobjects Based on Simulation," 2023 IEEE International Conference pn Robotics and Automation (ICRA), 2023, pp. 1-8. https://people.eecs.berkeley.edu/~jfc/papers/92/FCicra92.pdf Downloaded Jun. 25, 2024.

* cited by examiner

DEVICE AND METHOD FOR TRAINING A MACHINE-LEARNING MODEL FOR DETERMINING A GRASP OF A MULTI-FINGER GRIPPER FOR MANIPULATING AN OBJECT

CROSS REFERENCE

The present application claims the benefit under 35 U.S.C. § 119 of European Patent Application No. EP 23 18 8221.8 filed on Jul. 27, 2023, which is expressly incorporated herein by reference in its entirety.

FIELD

The present invention relates to devices and methods for training a machine-learning model for determining a grasp of a multi-finger gripper for manipulating an object.

BACKGROUND INFORMATION

Robotic grasping is a fundamental skill required for manipulating objects in cluttered environments, e.g. in bin picking applications. Multi-fingered robotic hands, such as the "Shadow Hand", mimic the human hand's structure, enabling complex object manipulations. Data-driven grasp planning for multi-fingered robotic hands aim at finding a hand configuration that provides a stable fixture of the target object inside the hand. It involves predicting the 6D pose of the robotic gripper, along with determining the joint angles of the fingers for multi-fingered hands. This increases the difficulty by increasing the number of degrees of freedom.

Accordingly, effective approaches for training a machine-learning model to predict grasps, in particular for multi-fingered grippers, are desirable.

The paper by C. Ferrari and J. F. Canny, "Planning optimal grasps." in ICRA, vol. 3, no. 4, 1992, p. 6, referred to as reference 1 in the following, describes, in particular, the Q1 grasp metric.

SUMMARY

According to various embodiments of the present invention, a method for training a machine-learning model for determining a grasp of a multi-finger gripper for manipulating an object is provided comprising, for each of a plurality of scenes, each scene including (at least) an object in a respective pose (i.e. each scene comprises one or more objects in various positions and orientations wherein the objects may different between different scenes but may also be (at least partially) the same)

Determining a point cloud representation of the object included in scene;

Determining, by the machine-learning model, a grasp for each of a plurality of surface points of the object, wherein each grasp is a multi-finger grasp specifying a palm position and finger joint configurations;

Determining a grasp loss of the grasp, wherein the loss includes at least one of a (differentiable) collision loss and a (differentiable) grasp stability loss;

Determining a total loss including the determined grasp losses (i.e. combining, e.g. adding or averaging the grasp losses) and Adjusting the machine-learning model to reduce the total loss (i.e. adjusting parameter values, typically weights, in a direction such that the total loss is reduced (i.e. would be lower in another forward pass), i.e. according to a gradient of the loss, typically using back propagation).

The method according to the present invention described above allows training a machine learning model (e.g. a neural network) to predict multi-fingered grasps in the form of an efficient grasp representation (palm position and joint configurations) that facilitates the acquisition of dexterous grasping skills on complex objects while achieving efficient training.

In particular for a multi-fingered gripper, collision loss is an important aspect to consider because each finger may collide with other objects or e.g. the wall of a bin from which the object should be taken. It may be determined by determining a mesh of the gripper, determining collision points from the mesh of the gripper and calculating distances to meshes of the objects, other objects or other elements of the scene (such as the wall of the bin).

In the following, various embodiments are described.

Embodiment 1 is a method for training a machine-learning model as described above.

Embodiment 2 is the method of embodiment 1, wherein the grasp stability loss is an upper bound of the Q1 metric loss.

Since the Q1 metric, as well as a lower bound for it, are difficult to compute, using the upper bound for the Q1 metric allows a more efficient training.

Embodiment 3 is the method of embodiment 1 or 2, comprising determining, for each scene one or more ground truth grasps and determining the total loss to include, for each scene, a supervised training loss between the determined grasps and the one or more ground truth grasps.

Thus, expert knowledge can be included to have the machine-learning model to learn "best" grasps.

Embodiment 4 is the method of any one of embodiments 1 to 3, comprising determining, from the point cloud representation, a surface mesh of the object and determining the total loss to include, for each determined grasp, a guidance loss which punishes distance between contact points of the multi-finger gripper according to the determined grasp and the surface of the object as given by the surface mesh.

Thus, the machine-learning model learns to determine grasps that actually touch the object. The mesh may also (or alternatively) be used to determine the grasp stability loss.

Embodiment 5 is the method of any one of embodiments 1 to 4, further comprising, for each scene and each determined grasp, determining, by the machine-learning model, a confidence of the grasp (i.e. a confidence of the machine-learning model in the grasp) and reducing a loss contribution of the determined grasp the more the higher the confidence determined for the grasp is.

So, it can be avoided that the machine-learning model is "trained away" from grasps in which it is very confident.

Embodiment 6 is a method for controlling a robot, comprising training a machine-learning model according to any one of embodiments 1 to 5, obtaining a point cloud representation of an object to be manipulated, determining a grasp by feeding the point cloud representation of the object to be manipulated from the point cloud representation to the trained machine-learning model and controlling the robot to perform the determined grasp to manipulate the object.

Embodiment 7 is a data processing device (in particular a robot controller), configured to perform a method of any one of embodiments 1 to 6.

Embodiment 8 is a computer program comprising instructions which, when executed by a computer, makes the computer perform a method according to any one of embodiments 1 to 6.

Embodiment 9 is a computer-readable medium comprising instructions which, when executed by a computer, makes the computer perform a method according to any one of embodiments 1 to 6.

In the figures, similar reference characters generally refer to the same parts throughout the different views. The figures are not necessarily to scale, emphasis instead generally being placed upon illustrating the principles of the present invention. In the following description, various aspects are described with reference to the figures.

DETAILED DESCRIPTION OF EXAMPLE EMBODIMENTS

The following detailed description refers to the accompanying drawings that show, by way of illustration, specific details and aspects of this disclosure in which the present invention may be practiced. Other aspects may be utilized and structural, logical, and electrical changes may be made without departing from the scope of the present invention. The various aspects of this disclosure are not necessarily mutually exclusive, as some aspects of this disclosure can be combined with one or more other aspects of this disclosure to form new aspects.

In the following, various examples will be described in more detail.

Figure 1:
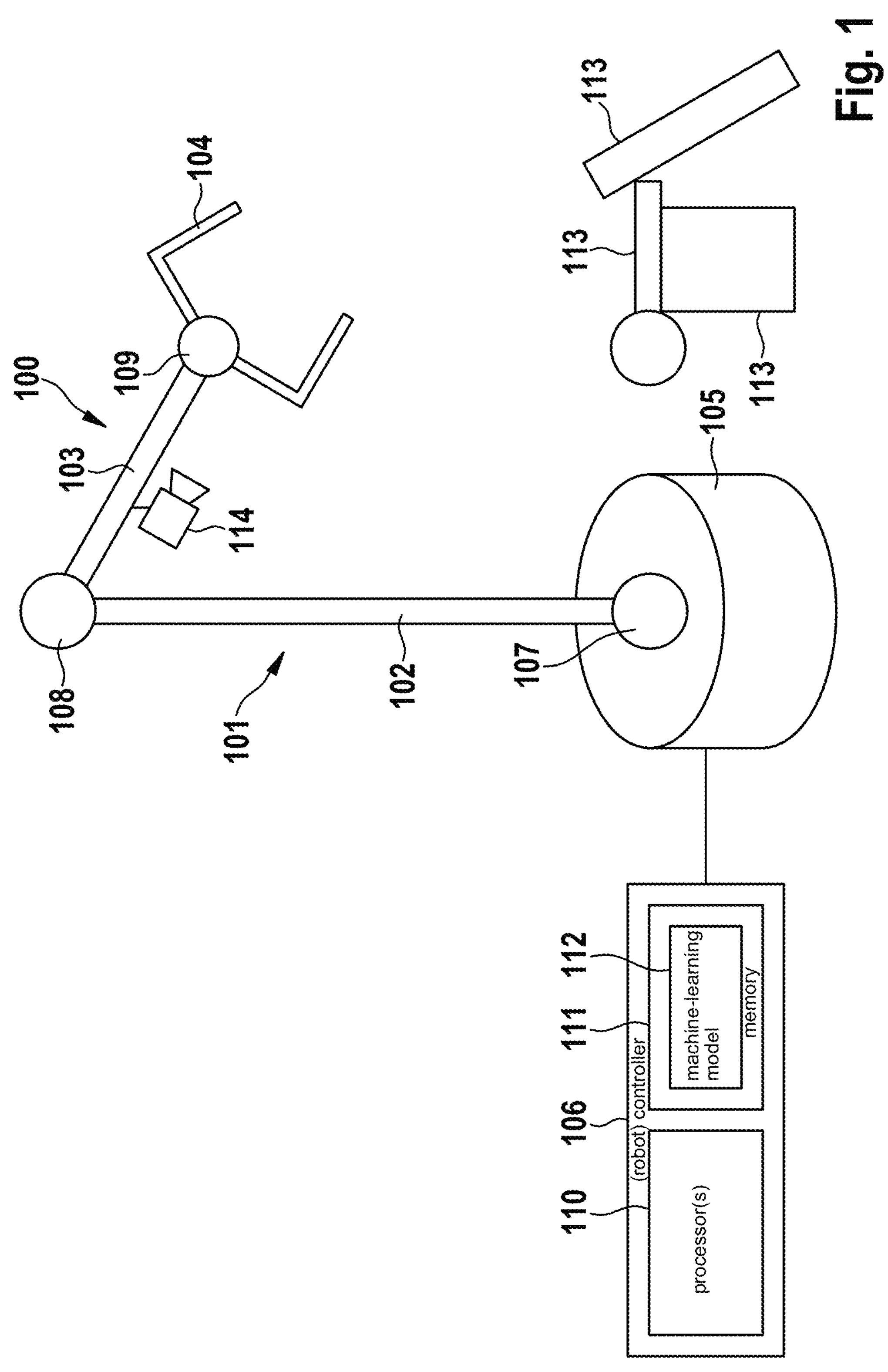
FIG. 1 shows a robot according to an example embodiment of the present invention.

FIG. 1 shows a robot 100.

The robot 100 includes a robot arm 101, for example an industrial robot arm for handling or assembling a work piece (or one or more other objects 113). The robot arm 101 includes manipulators 102, 103, 104 and a base (or support) 105 by which the manipulators 102, 103, 104 are supported. The term "manipulator" refers to the movable members of the robot arm 101, the actuation of which enables physical interaction with the environment, e.g. to carry out a task. For control, the robot 100 includes a (robot) controller 106 configured to implement the interaction with the environment according to a control program. The last member 104 (furthest from the support 105) of the manipulators 102, 103, 104 is also referred to as the end-effector 104 and includes a grasping tool (which may also be a suction gripper).

The other manipulators 102, 103 (closer to the support 105) may form a positioning device such that, together with the end-effector 104, the robot arm 101 with the end-effector 104 at its end is provided. The robot arm 101 is a mechanical arm that can provide similar functions as a human arm.

The robot arm 101 may include joint elements 107, 108, 109 interconnecting the manipulators 102, 103, 104 with each other and with the support 105. A joint element 107, 108, 109 may have one or more joints, each of which may provide rotatable motion (i.e. rotational motion) and/or translatory motion (i.e. displacement) to associated manipulators relative to each other. The movement of the manipulators 102, 103, 104 may be initiated by means of actuators controlled by the controller 106.

The term "actuator" may be understood as a component adapted to affect a mechanism or process in response to be driven. The actuator can implement instructions issued by the controller 106 (the so-called activation) into mechanical movements. The actuator, e.g. an electromechanical converter, may be configured to convert electrical energy into mechanical energy in response to driving.

The term "controller" may be understood as any type of logic implementing entity, which may include, for example, a circuit and/or a processor capable of executing software stored in a storage medium, firmware, or a combination thereof, and which can issue instructions, e.g. to an actuator in the present example. The controller may be configured, for example, by program code (e.g., software) to control the operation of a system, a robot in the present example.

In the present example, the controller 106 includes one or more processors 110 and a memory 111 storing code and data based on which the processor 110 controls the robot arm 101. According to various embodiments, the controller 106 controls the robot arm 101 on the basis of a machine-learning model (e.g. including one or more neural networks) 112 stored in the memory 111.

The end-effector 104 may be a multi (e.g. five)-fingered hand. Thus, the end-effector 104 has, in addition to the degrees of features of its pose, additional degrees of freedom (and is thus highly dextrous). For example (according to the so-called "Shadow Hand"), it may have 24 degrees of freedom, including 3 positional degrees of freedom, 3 rotational degrees of freedom (i.e. 6 for the pose of the end-effector 104) and 18 finger joint angles (i.e. finger joint DoFs). For example, there are in total 24 joints, some fingers with four to five joints, some with three. However, all 24 joints are controlled by only 18 DoF (parameters where you can change the values to see the joints move) because some joints use the same DoF, therefore there are fewer DoFs than the number of joints.

The increased amount of degrees of freedom increases the complexity of the control. In particular, approaches designed for control of parallel grippers are typically not suitable for controlling an end-effector 104 which has the form of a multi-fingered hand.

According to various embodiment, an approach for generating dexterous high-DoF robotic hand grasping (i.e. grasp determination) with physically plausible and on-collision grasps from cluttered scenes consisting of unknown objects is provided which densely (i.e. for a high number of input points, e.g. each input point of a downsampled input point cloud) determines grasps from an input point cloud and includes a differentiable grasp planning that use differentiable optimization as inductive bias to integrate a generalized $Q_1$ grasp metric and a collision loss. The proposed approach allows predicting dense grasp distributions for cluttered scenes and formulates differentiable grasp planning as a continuous optimization. It enables the efficient prediction of a diverse set of grasps for a cluttered scene of objects, densely projected to their much less ambiguous contact points on the input point cloud. According to various embodiment, a machine-learning model 112 (in particular a neural network) is provided which can predict a multi-modal grasp distribution, e.g. dense (point-wise) grasp proposals, hence it achieves better generalization. The machine-learning model is i) geometry-aware, e.g. taking into account collision loss, and ii) physics-aware, e.g. taking into account Q1 grasp metric (grasp quality established based on contacts among gripper points and object points).

Figure 2:
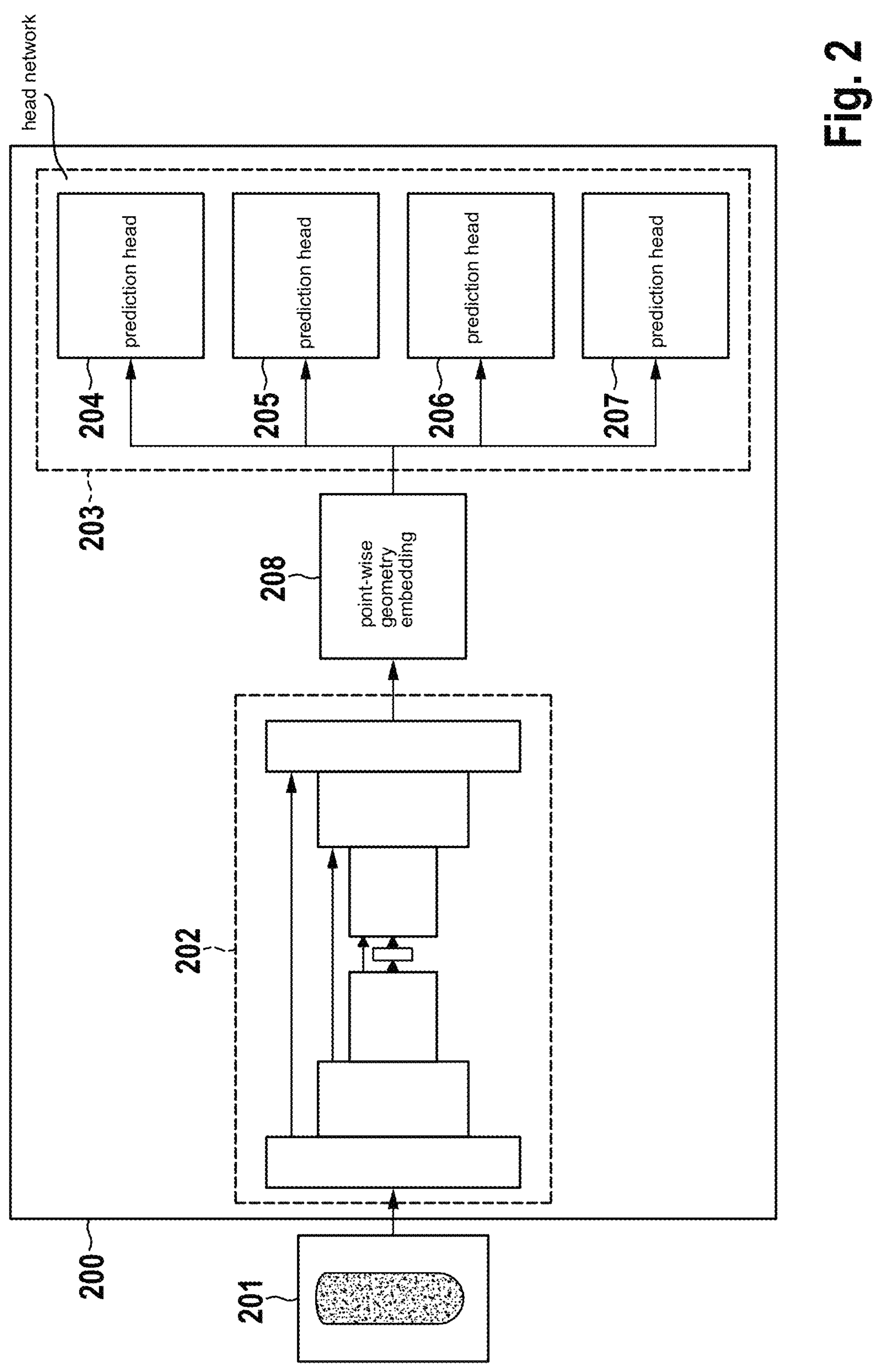
FIG. 2 illustrates a neural network for determining a multi finger grasp pose, according to an example embodiment of the present invention.

FIG. 2 illustrates a neural network 200 for determining a multi-finger grasp pose.

The input 201 of the neural network 200 is a point cloud P of a scene (in the workspace of the robot 100, e.g. registered from multi-views from one or more cameras 114). The point cloud P in particular represents an object (e.g. object 113) to be grasped (e.g. at least a part of the points of the points cloud P are surface points of the object to be grasped). The neural network 200 predicts grasps densely projected on the object point cloud (i.e. the points of the point cloud corresponding to surface points of the object). Each grasp is represented as a 6D reference palm point p (the origin of the palm) and the joint angles of the hand fingers θ, i.e. g={p, θ}.

According to one embodiment, the end-effector 104 has the form of a 5-finger-hand and has (6+18)-DoFs with:

- the parameter p including a three-dimensional translation vector t={x, y, z} and a three-dimensional rotation vector {α, β, γ} of the palm (i.e. a pose of the end-effector 104 as a whole),
- the 18-dimensional parameter θ includes 18 finger joint angles.

The neural network 200 predicts a set of diverse, collision-free grasps for the object (or each object in case the point cloud includes representation of multiple objects) in a scene with a single inference. This is accomplished by processing raw visual 3D data (i.e. the point cloud) and directly predicting the 6D-pose of the palm associated with each object point on the input point cloud as well as the joint angles of the fingers.

According to various embodiments, a contact grasp representation is used where the palm's translation, denoted by $t\in\mathfrak{R}^3$, of successful ground truth grasps is mapped to their corresponding contact points (on the respective object), denoted by $p_{obj}$.

To simplify the training, a 6D continuous representation of rotations to describe the orientation of the robot palm is used, i.e. two 3-dim vectors {a, b}, and the orientation matrix is reconstructed through the Gram-Schmidt process. The 6D continuous representation can be transformed into a more conventional representation, such as quaternions. The advantage of this representation is that it eliminates any discontinuities, resulting in more stable training. For the expression of the palm position, instead of directly calculating it, an object point, denoted by $p_{obj}\in\mathfrak{R}^3$ is used to represent the translation of the palm as follows:

$$t_{palm} = p_{obj} + \text{offset}_{x,y,z} \quad (1)$$

where $\text{offset}_{x,y,z}\in\mathfrak{R}^3$ is the offset from a reference point to the palm. This approach reduces the prediction interval by only requiring prediction offsets around the object points.

Regarding the joint angles $I\in\mathfrak{R}^{18}$ of the fingers, the neural network 200 directly predicts their values. The result of this representation is a 27-dimensional state vector that describes the grasp posture of the end-effector 104, i.e.

$$g=\{\text{offset}_{x,y,z},\{a,b\},I\} \text{ per contact point } p_{obj}.$$

For training (including validation) and testing the neural network 200, various workspace (e.g. table-top) scenes with ground-truth grasps (labels) may be generated. The scenes may contain different selections of objects and different poses (e.g. upright, lying, stacked etc.). For each object in a scene, multiple grasps (e.g. hundreds) may be included as labels in the training data.

As the training input data, depth images of the generated scenes may be rendered (e.g. from multiple views, e.g. from all sides of the workspace) and a training input point cloud is generated from the depth images.

The generated poses of the objects from the scenes may be used to transform the ground truth grasps in a canonical state to objects in the created scenes. For example, the grasps are matched to object points in the respective (training) input point cloud to generate dense annotations (i.e. ground truth grasp labels) of the point cloud. The matching of the grasps is for example done by using a reference point on the palm of the hand as follows: the distance $d_t$ between the ground-truth reference point $p_p$ of the palm origin and the i-th object point $p_{o,i}$ is determined and, in addition, the signed distance $d_n$ along the normal direction $n_{o,i}$ of the mesh of the object is determined as follows $$d_t = \|p_p - p_{o,i}\|_2,\ \ d_n = n_{o,i} * (p_p - p_{o,i}). \quad (2)$$

A ground-truth grasp is for example matched to an object point in the point cloud, if the translation of the palm is closer than 5 mm to this object point and has a positive distance in the normal direction. Specifically, for object point i, there is a set of ground-truth grasps whose reference point p satisfies this matching condition $$g_i = \{g_p | d_t <= 5 \text{ mm } \ \&\ d_n > 0\}. \quad (3)$$

The set of matched grasps $g_i$ is a non-unique matching for each point i per object o. An object point with a non-empty set $g_i$ is set with positive label, otherwise negative.

The neural network 200 predicts, for each input point cloud 201, dense grasp proposals for points on the input point cloud PCL, i.e. implements a function $F:PCL\mapsto\mathcal{G}$ that maps an input point clouds in $\mathfrak{R}^{N\times3}$ to an output element (including grasps configurations for multiple grasp points). For the following, $G\in\mathfrak{R}^{m\times27}$, where m is the number of predicted grasp points and 27 is the dimension of each grasp representation as described above. Since the prediction is supposed to be "dense", the number m is high, e.g. m=512 points.

FIG. 2 illustrates the result of a dense grasp distribution on an input point cloud (of a cylinder-shaped object). Each line represents one grasp point and specifies the normal direction to the object surface in that grasp point.

The neural network 200 for example comprises a feature extraction network 202 and for example uses a segmentation-style structure. This allows the feature network 202 to extract an embedding for individual points. For example, a U-shaped network is used as feature-extracting network 202 (which may be seen as backbone). The layers of the feature-extraction network are for example based on the set abstraction modules from PointNet++, e.g. four downsampling modules followed by three up-sampling modules. As an example, let the network's input 201 be a point cloud of N=2048 points (which may be a downsampled point cloud of an original point cloud generated from one or more images). The first downsampling module of the feature extraction network 202 reduces the number of points to 512.

This is the level that is used for the predictions of the network (by a head network 203 comprising prediction heads 204, 205, 206, 207). The output of the feature-extraction network 202 is a point-wise geometry embedding 208 for the input point cloud 201 which includes a 128-dimensional feature vector for each of these 512 points.

The head network 203 transforms the feature representation for each of the 512 points to a respective grasp representation. It comprises a respective prediction head 204, 205, 206, for each of position offset, orientation, and the finger joint angles of each grasp prediction. The motivation of using different heads for the three different parts is that each part has a different scale and unit. Separating each prediction allows each head network 204, 205, 206 to learn a specific part. The head networks 204, 205, 206, may for example simple three-layered MLP (multi-layer perceptron) networks: the first two layers of each head network 204, 205, 206 are linear layers with the ReLu activation function which also use batch normalization. The following last linear layer predicts the outputs (and does not have an activation function). The output dimensions of the head networks 204, 205, 206 corresponds to the dimensions of the grasp representation (times the number m of predicted grasps for each scene, m=512 in this example).

To enable selection of the best grasps from the predicted m grasps, according to one embodiment, an additional head network 207 is provided to predict a one-dimensional confidence value. This has the same structure as the other head networks 204, 205, 206 but with an additional Sigmoid activation function at the output.

Further, according to various embodiments, a model of the hand (i.e. the hand-shaped end-effector) is transformed to the predicted grasp in the scene. For this, the pose of each joint of the hand is calculated. Using the predicted joint states of the predicted grasp as input a forward kinematic layer may be applied to transform a hand mesh model into its corresponding world coordinate state, i.e. all points on the gripper sampled from the hand model mesh are transformed to the predicted grasp. Specifically, the predicted joint angles may be used to calculate the homogeneous transformation from the parent joint to each child joint. To enforce the joint angle limits in the predictions, the joint angles are clamped within a predefined range $\Theta=\max(\min(\Theta, \Theta_{max}),\Theta_{min})$. The position of each link may be calculated by applying all transformation from the chain (succession of links (finger segments) connected by joints) to the link (finger segment). This allows calculating loss functions based on collisions of the prediction with the object.

For training the neural network 200 to predict grasp representations, according to various embodiments, a task loss function is used which is a combination of different loss functions. The task loss can be expressed for a prediction at point i on the input point cloud 201 as follows $$\mathcal{L}_{task,i} = w_1\mathcal{L}_{ch} + w_2\mathcal{L}_{co} + w_3\mathcal{L}_{gu} + w_4\mathcal{L}_{Q_1^{upper}} \tag{4}$$

where $w_1$, $w_2$, $w_3$, $w_4$ are weighting coefficients among the different loss terms. The loss terms are described in the following.

a) Supervised (training) loss: The Chamfer loss $\mathcal{L}_{ch}$ calculates the distance between the ground truth grasps and the predictions of the network 200. For calculating this loss, the closest ground truth is determined which satisfies the matching condition as described in equation (3). This added condition enables the matching of object points with ground truth grasps locally only. In essence, the Chamfer loss is calculated at each predicted point i with a predicted pose $\hat{g}_i$; as follows $$\mathcal{L}_{ch,i} = \min_p \|\hat{g}_i - g_p\|^2 \quad \text{s.t. } p \in g_i \tag{5}$$

where $g_i$ is the ground-truth grasp pose set at point i as defined in equation (3). It should be noted that we only calculate $\mathcal{L}_{ch,i}$ on points with positive label.

b) Differentiable collision loss: The collision loss is calculated based on the mesh model of the hands. For this loss function, collision points (e.g. 2000 collision points) are sampled from the hand model mesh. These points are used to calculate the distance between the meshes of the scene and the hand model, e.g. including the table, the objects and the links of the hands (to capture self-collision). The collision loss is then calculated as follows $$\mathcal{L}_{co} = \frac{1}{2000 * L}\sum_{i=1}^{2000}\max(d_c^i, 0)^2,$$

where $$d_c^i$$

is the signed distance from the closed point of any object mesh to every collision point i and L is the number of meshes in the scene.

c) Guidance loss: The guidance loss serves to guide the inside of the hand towards the closest mesh. The guidance loss is supposed to minimize the distance between the hand and the surface of the object. The guidance loss uses the distance calculation from the loss functions guides the hand towards the next mesh surface. To calculate the guidance loss, a set of for example V=45 hand points is labelled which are located on the inside of the hand. These points are used to calculate the distance between the meshes of the scene and the hand model. The distance with respect to every mesh in the scene including the table, the objects and the links of the hands is calculated. The loss is then calculated by $$\mathcal{L}_{gu} = \sum_j^V \|p_j - p_{mesh,j}\|^2,$$

where $p_j$ is the position of the hand point, and $p_{mesh,j}$ is the point among all meshes closest to $p_j$. The position of these collision points is calculated by a collision point layer. The inside the hand points define a subset of these points. For the multi-object input scenes, all object meshes are treated as one mesh. The hand is guided towards the closed face of a mesh regardless of the which mesh the face belongs to.

d) Differentiable Q1 metric loss: The last term of the loss function of equation (4) is the upper bound of the Q1 metric (see reference 1). This upper bound describes the quality of a (force closure) grasp with the minimal wrench to break the grasp. Using a lower bound of the Q1 metric can result in higher grasp quality. However its computation is expensive. The upper bound is given by $$\mathcal{L}_{Q_1^{upper}} = \min_{j=1,\ldots,D}\left[\max s_j^T M w\right],$$

where M is a metric tensor to weigh the torque components, w is the wrench of the grasp, and $s_j$ is the support of the grasp point.

e) Confidence loss: In the task loss formulation, the confidence is not regarded in the loss function of the predictions.

The joint loss function including the confidence may be calculated with $$\mathcal{L}_{task,confidence} = \frac{1}{B}\frac{1}{m}\sum_{i}^{m} c_i \mathcal{L}_{task,i} - w_5 \log(c_i),$$

where $c_i$ is a predicted confidence score at point i, B is the batch size and N is number of points in the prediction. The neural network 200 may for example be trained using the loss function $L_{confidence}$ (i.e. adapting the neural network 200 to reduce the loss function $L_{confidence}$ using back propagation) with, for example, $w_5=1$.

Figure 3:
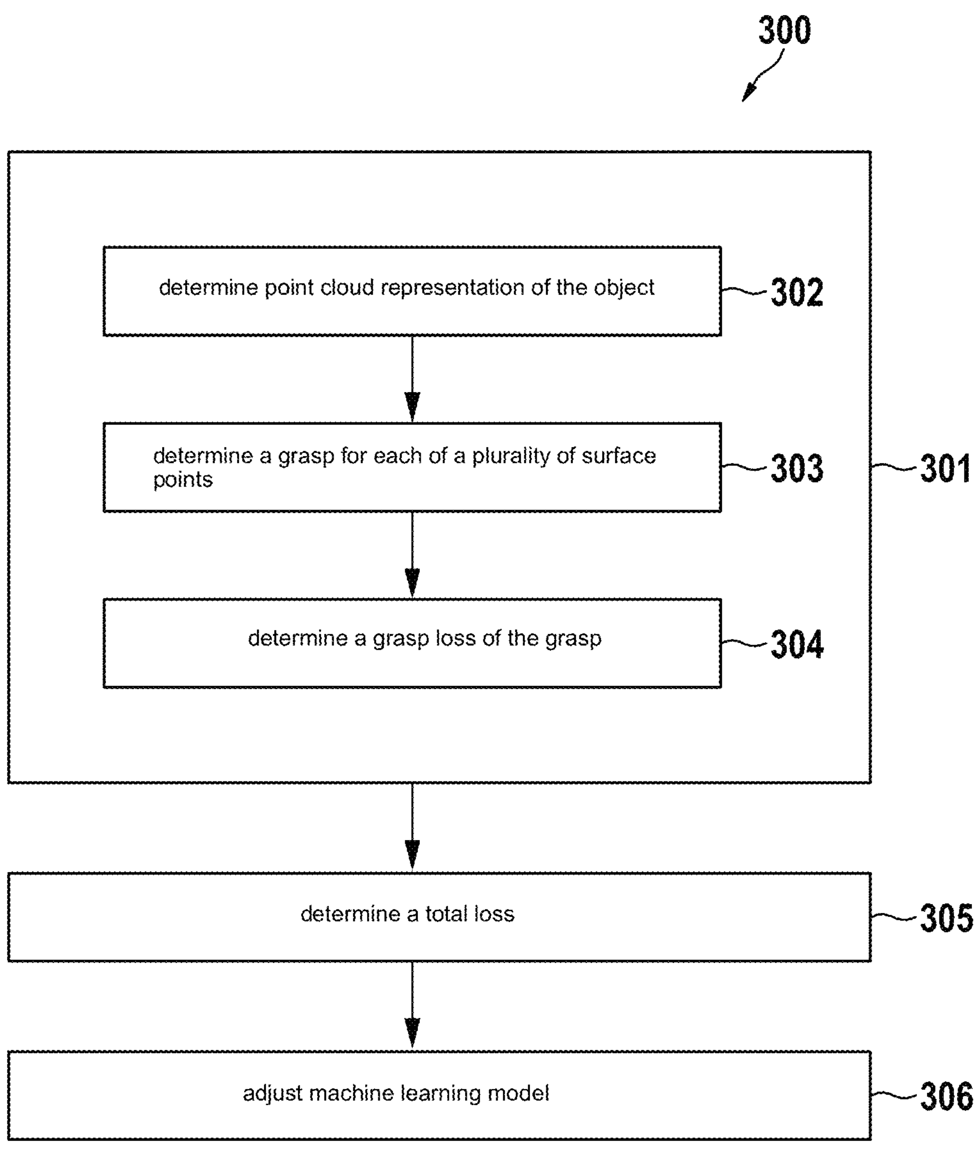
FIG. 3 shows a flow diagram illustrating a method for training a machine-learning model for determining a grasp of a multi-finger gripper for manipulating an object, according to an example embodiment of the present invention.

In summary, according to various embodiments, a method is provided as illustrated in FIG. 3.

FIG. 3 shows a flow diagram 300 illustrating a method for training a machine-learning model for determining a grasp of a multi-finger gripper for manipulating an object.

In 301, for each of a plurality of (training) scenes, each scene including (at least) an object in a respective pose (i.e. each scene comprises one or more objects in various positions and orientations wherein the objects may different between different scenes but may also be (at least partially) the same)

a point cloud representation of the object included in scene is determined in 302;

a grasp for each of a plurality of surface points of the object is determined by the machine-learning model, wherein each grasp is a multi-finger grasp specifying a palm position (e.g. by means of a position of a palm reference point) and finger joint configurations (e.g. joint angles for all joints) in 303;

a grasp loss of the grasp, wherein the loss includes at least one of (e.g. both of) a (differentiable) collision loss (e.g. calculated from an object mesh (which may be determined from the point cloud and/or a mesh of the gripper, see item b) above) and a (differentiable) grasp stability loss (based on object mass and friction between gripper and object, see item d) above; this loss is analytically difficult to compute, therefore an approximation is used according to various embodiments) is determined in 304.

In 305, a total loss including the determined grasp losses (i.e. combining, e.g. adding or averaging the grasp losses) is determined.

In 306, the machine-learning model is adjusted to reduce the total loss (i.e. adjusting parameter values, typically weights, in a direction such that the total loss is reduced (i.e. would be lower in another forward pass), i.e. according to a gradient of the loss, typically using back propagation).

Various embodiments may receive and use image data (i.e. digital images) from various visual sensors (cameras) such as video, radar, LiDAR, ultrasonic, thermal imaging, motion, sonar etc., for example as a basis for the point cloud representation of the object.

The method of FIG. 3 may be performed by one or more data processing devices (e.g. computers or microcontrollers) having one or more data processing units. The term "data processing unit" may be understood to mean any type of entity that enables the processing of data or signals. For example, the data or signals may be handled according to at least one (i.e., one or more than one) specific function performed by the data processing unit. A data processing unit may include or be formed from an analogue circuit, a digital circuit, a logic circuit, a microprocessor, a microcontroller, a central processing unit (CPU), a graphics processing unit (GPU), a digital signal processor (DSP), a field programmable gate array (FPGA), or any combination thereof. Any other means for implementing the respective functions described in more detail herein may also be understood to include a data processing unit or logic circuitry. One or more of the method steps described in more detail herein may be performed (e.g., implemented) by a data processing unit through one or more specific functions performed by the data processing unit.

Accordingly, according to one embodiment, the method is computer-implemented.

What is claimed is:

1. A computer-implemented method for training a machine-learning model to determine grasps of a multi-finger gripper for manipulating an object, the method comprising:

generating, for a scene that includes an instance of the object, a three-dimensional point cloud representation of the scene including the object;

obtaining, from the three-dimensional point cloud representation, a subset of distinct three-dimensional points that collectively represent three-dimensional contours of an exterior surface of the object;

identifying, from the subset of distinct three-dimensional points that have been obtained from the three-dimensional point cloud representation, a plurality of distinct surface points located at different respective three-dimensional positions on the exterior surface of the object, wherein at least a subset of the plurality of distinct surface points each is associated with a respective set of one or more of a plurality of ground-truth grasps;

determining, by the machine-learning model, a plurality of predicted grasps for the plurality of distinct surface points, wherein each respective one of the plurality of predicted grasps:

is associated with a respective surface point of the plurality of distinct surface points; and includes a predicted palm pose and predicted finger-joint configurations of the multi-finger gripper;

determining, for each respective surface point of the subset of the plurality of distinct surface points, a respective grasp-loss value representing a difference between a respective predicted grasp associated with the respective surface point and a selected ground-truth grasp from the respective set associated with the respective surface point, wherein the grasp-loss values are based on a collision loss and/or a grasp stability loss;

combining the grasp-loss values for the plurality of distinct surface points to determine an overall training loss for the scene; and adjusting parameters of the machine-learning model to reduce the overall training loss.

2. The method of claim 1, wherein the grasp stability loss is an upper bound of a contact-stability metric representing a quality of each respective one of the determined predicted grasps.

3. The method of claim 1, further comprising:

determining, from the subset of distinct three-dimensional points that were obtained from the three-dimensional point cloud, a surface mesh of the object, wherein the determination of the overall training loss includes determining, for each respective one of the determined predicted grasps, a guidance loss which penalizes distance between contact points of the multi-finger gripper according to a respective predicted grasp and a surface of the object as given by the surface mesh.

4. The method of claim 1, further comprising, for each respective one of the determined predicted grasps, determining, by the machine-learning model, a confidence score for a respective predicted grasp and reducing a loss contribution of the respective predicted grasp according to the confidence score, where the higher the confidence score, the greater is the reduction.

5. The method according to claim 1, further comprising:

obtaining a further point cloud representation, which is of a further object that is to be manipulated;

determining a further grasp for the further object by feeding the further point cloud representation of the further object to the trained machine-learning model; and controlling a robot to perform the determined further grasp to manipulate the further object.

6. The method of claim 1, further comprising downsampling the three-dimensional point cloud representation of the scene to obtain a downsampled set of three-dimensional points, wherein the plurality of distinct surface points comprises the downsampled set, and wherein the machine-learning model determines the respective predicted grasp for each respective surface point of the downsampled set.

7. The method of claim 1, wherein each respective one of the plurality of predicted grasp determined by the machine-learning model is represented in coordinates relative to the respective surface point with which the respective predicted grasp is associated.

8. The method of claim 1, further comprising determining, by the machine-learning model, a respective confidence score for each respective one of the plurality of predicted grasps, wherein the confidence score is an output of the machine-learning model that represents an estimated reliability of the respective predicted grasp, and wherein the confidence scores are used in selecting, from the plurality of predicted grasps, at least one grasp to be executed by the multi-finger gripper.

9. The method of claim 1, wherein identifying the respective set of one or more ground-truth grasps associated with each surface point of the subset comprises, for each respective surface point, selecting ground-truth grasps whose respective palm positions are within a predetermined spatial distance of the respective surface point, such that the respective set includes ground-truth grasps having palm positions sufficiently near that surface point.

10. The method of claim 9, wherein when the respective set of ground-truth grasps associated with a surface point is empty, the surface point is excluded from the determination of the respective grasp-loss values, and wherein, when the respective set is non-empty, determining the respective grasp-loss value comprises:

comparing each ground-truth grasp of the respective set of ground-truth grasps associated with the surface point to the respective predicted grasp for that surface point using a predefined metric of comparison to find which of the compared ground-truth grasps is a best-matching ground-truth grasp that matches most closely to the respective predicted grasp; and selecting, from the respective set of ground-truth grasps associated with the surface point, the best-matching ground-truth grasp; and determining the grasp-loss value based on a difference between the predicted grasp and the selected best-matching ground-truth grasp.

11. The method of claim 1, further comprising:

processing a plurality of additional scenes that each includes a respective instance of the object by repeating, for each of the additional scenes, the generating, obtaining, identifying, determining of predicted grasps, determining of grasp-loss values, and combining of grasp-loss values to obtain a respective overall training loss for each of the additional scenes; and adjusting the parameters of the machine-learning model based on an aggregation of the overall training losses for the scene and the additional scenes.

12. A data processing device configured to train a machine-learning model to determine grasps of a multi-finger gripper for manipulating an object, the data processing device comprising a processing system that includes at least one processor, wherein the processing system is programmed to:

generate, for a scene that includes an instance of the object, a three-dimensional point cloud representation of the scene including the object;

obtain, from the three-dimensional point cloud representation, a subset of distinct three-dimensional points that collectively represent three-dimensional contours of an exterior surface of the object;

identify, from the subset of distinct three-dimensional points that have been obtained from the three-dimensional point cloud representation, a plurality of distinct surface points located at different respective three-dimensional positions on the exterior surface of the object, wherein at least a subset of the plurality of distinct surface points each is associated with a respective set of one or more of a plurality of ground-truth grasps;

determine, by the machine-learning model, a plurality of predicted grasps for the plurality of distinct surface points, wherein each respective one of the plurality of predicted grasps:

is associated with a respective surface point of the plurality of distinct surface points; and includes a predicted palm pose and predicted finger-joint configurations of the multi-finger gripper;

determine, for each respective surface point of the subset of the plurality of distinct surface points, a respective grasp-loss value representing a difference between a respective predicted grasp associated with the respective surface point and a selected ground-truth grasp from the respective set associated with the respective surface point, wherein the grasp-loss values are based on a collision loss and/or a grasp stability loss;

combine the grasp-loss values for the plurality of distinct surface points to determine an overall training loss for the scene; and adjust parameters of the machine-learning model to reduce the overall training loss.

13. A non-transitory computer-readable medium on which are stored instructions for training a machine-learning model to determine grasps of a multi-finger gripper for manipulating an object, the instructions, when executed by a processor, causing the processor to perform the following steps:

generating, for a scene that includes an instance of the object, a three-dimensional point cloud representation of the scene including the object;

obtaining, from the three-dimensional point cloud representation, a subset of distinct three-dimensional points that collectively represent three-dimensional contours of an exterior surface of the object;

identifying, from the subset of distinct three-dimensional points that have been obtained from the three-dimensional point cloud representation, a plurality of distinct surface points located at different respective three-dimensional positions on the exterior surface of the object, wherein at least a subset of the plurality of distinct surface points each is associated with a respective set of one or more of a plurality of ground-truth grasps;

determining, by the machine-learning model, a plurality of predicted grasps for the plurality of distinct surface points, wherein each respective one of the plurality of predicted grasps:

is associated with a respective surface point of the plurality of distinct surface points; and includes a predicted palm pose and predicted finger-joint configurations of the multi-finger gripper;

determining, for each respective surface point of the subset of the plurality of distinct surface points, a respective grasp-loss value representing a difference between a respective predicted grasp associated with the respective surface point and a selected ground-truth grasp from the respective set associated with the respective surface point, wherein the grasp-loss values are based on a collision loss and/or a grasp stability loss;

combining the grasp-loss values for the plurality of distinct surface points to determine an overall training loss for the scene; and adjusting parameters of the machine-learning model to reduce the overall training loss.

* * * * *